United States Patent Office 2,757,166
Patented July 31, 1956

2,757,166

POLYMERIZATION CATALYST

Nicholas R. Segro, Darien, and James A. Melchore, Greenwich, Conn., assignors to American Cyanamid Company, New York, N. Y., a corporation of Maine No Drawing. Application October 15, 1952,
Serial No. 314,972

5 Claims. (Cl. 260—85.5)

This invention relates to a process for the bulk polymerization, including copolymerization, of acrylonitrile. More particularly it relates to a process for the bulk polymerization of acrylonitrile, including copolymerization of acrylonitrile with at least one other monomeric compound containing a polymerizable $CH_2=CH<$ grouping, in the presence of a catalyst selected from a group consisting of tertiary butyl permaleic acid and tertiary butyl perphthalic acid.

An object of this invention is to bulk polymerize acrylonitrile rapidly and without difficulties in the presence of a catalyst to substantial completion. It is a further object of this invention to bulk polymerize acylronitrile, including copolymerization of acrylonitrile with at least one other monomeric compound containing a polymerizable $CH_2=C<$ grouping to substantial completion in the presence of a catalyst such as tertiary butyl permaleic acid and tertiary butyl perphthalic acid. These and other objects of the present invention will be discussed more fully below.

Polymerization reactions are normally carried out in the presence of heat, light, pressure and catalysts or a combination thereof. Ultraviolet light is more effective than ordinary light. The temperature of reaction conversion depends primarily upon the reactivity and the boiling point of the monomer or monomers to be co-polymerized. In most cases the temperature of polymerization will be within the range of 40° C. to 200° C., usually within the range of 60° C. to 150° C., depending upon the particular monomers involved, the rapidity of polymerization desired as well as the type of physical properties desired. The velocity of polymerization usually increases with pressure which allows corresponding increases in temperatures so that limitations as to the reactivity of the monomer or monomers and the apparatus available determine the pressure employed. Various catalysts have been proposed to accelerate the resinification. Most of them fall into the classes of oxidizing agents, acids, metallic halides and alkalies.

Considerable difficulty has been encountered in the past in obtaining substantial completion of bulk polymerization reactions involving acrylonitrile as a monomeric reactant. In order to obtain substantial completion of polymerization and copolymerization involving acrylonitrile a high temperature is required, but at high temperatures discoloration of the product is obtained. Even if the monomer to be copolymerized with the acrylonitrile is extremely reactive, e. g. styrene, the presence of acrylonitrile is alone sufficient to retard seriously the rate of conversion of monomers into a copolymer. As a result, homopolymers of acrylonitrile or copolymers containing acrylonitrile possess significant quantities of unreacted, residual monomeric material which must be removed in order to obtain a copolymer of satisfactory physical properties. Obviously, the step of removing unreacted, residual monomeric material is undesirable and time consuming.

It is an advantage of the process of this invention that the bulk polymerization of acrylonitrile with other monomeric compounds will progress rapidly and without difficulty in the presence of a catalyst selected from the group consisting of tertiary butyl permaleic acid and tertiary butyl perphthalic acid to substantial completion without the necessity of removing unreacted, residual monomeric material.

It is a further advantage of this invention that the polymer and polymers hereby obtained possess unusually good heat distortion properties which is a direct function of polymer conversion.

Included within the process definition are copolymerization reactions in which the monomeric compound to be copolymerized with the acrylonitrile may be described as having at least one $CH_2=CH<$ grouping and preferably having a boiling point of at least 60° C. Examples of such compounds are styrene; nuclear substituted alkyl styrenes, e. g., o,m. or p-methyl styrene, 2,4-dimethyl styrene and the like, nuclear substituted halo styrenes, e. g., 2,4-dichlorostyrene, 2,5-dichlorostyrene and the like; the side-chain alkyl and halo substituted styrenes, e. g., α-chloro styrene, α-methyl styrene and the like; alkyl esters of acrylic and methacrylic acids, e. g., ethyl acrylate, methyl methacrylate, ethyl methacrylate and the like; esters of unsaturated alcohols with saturated acids, e. g., vinyl acetate; vinyl propionate, allyl acetate and the like. Many other polymerizable monomeric compounds containing a $CH_2=C<$ group may also be used as will be understood by those skilled in the art. Also more than one monomer other than acrylonitrile may be used. For example, the invention contemplates not only copolymers but also tri-, tetra-, etc., polymers.

The process of this invention comprises polymerizing acrylonitrile in the bulk in the presence of from 0.02 to 5% by weight, based on the total weight of monomers, of a catalyst selected from the group consisting of tertiary butyl permaleic acid and tertiary butyl perphthalic acid. The precise amount to be used in each instant will be determined by such factors as desired rate of reaction, extent of exotherm of reaction, mol weight required for desired physical properties and the determination of an optimum amount is within the skill of the art.

The process of this invention is particularly effective in the interpolymerization of mixtures of polymers wherein acrylonitrile is present in an amount equal to at least 5% by weight of the total monomers. Lesser amounts of acrylonitrile are, in many monomer systems, not sufficient to retard seriously the rate of polymerization or lower the degree of conversion. However, the amount of acrylonitrile present in the mixture of monomers to be polymerized must lie within the range of about 5% to 35% by weight based on the total weight of monomers to impart the desired properties, i. e. flexual strength, abrasion, chemical resistance, heat distortion resistance, etc. to the reaction product. It will thus be seen that when a sufficient amount of acrylonitrile is polymerized with another monomeric compound to obtain the desired reaction product the difficulties encountered in the prior art such as low conversion efficiency are present. We have found that when a catalyst such as tertiary butyl permaleic acid and tertiary butyl perphthalic acid is employed in the polymerization of copolymerization reaction in the amount of from .02% to 5% by weight of the total monomers high reaction conversion and a clear product is obtained by reacting the monomer reactants at temperatures from 85° C. to 130° C. at a pressure of approximately 1 atmosphere.

The following examples are set forth primarily for the purpose of illustration. Any specific enumeration of detail set forth therein should not be interpreted as a limitation on the case except as indicated in the appended claims. All parts are parts by weight.

EXAMPLE 1

Into each of a series of elongated vessels there are placed 70 parts of styrene and 30 parts of acrylonitrile and there is then dissolved in each mixture 0.1% of catalyst according to the table set forth below. The mixtures in the vessels are purged for 60 seconds with nitrogen and the vessels are sealed. The mixtures are then subjected to a heating cycle of 24 hours at 85° C., 24 hours at 100° C., 48 hours at 120° C., and 72 hours at 130° C. The reaction vessels are cooled to room temperature and a mass of hard copolymers is removed from each. The copolymers thus obtained are granulated and compression molded into bars of the following dimensions: ½" x ½" x 5". The following table also presents heat distortion data obtained from molded bars of copolymers catalyzed with the various catalysts noted.

The heat distortion values in the following table were obtained by measuring the resistance to distortion of the molded bars when placed in boiling water and while the bar was under a compression force of 264 p. s. i. applied at the center of the 5" span for a maximum period of 15 minutes. A maximum distortion of 1 inch was allowed for each sample bar. If the sample distorted 1 inch in less than the maximum period of 15 minutes, the actual time for the 1-inch distortion was noted. Otherwise the actual distortion of the bar in the maximum 15-minute test period was noted, i. e. samples 19 and 20.

*Table I*

EFFECTIVENESS OF VARIOUS CATALYSTS UPON HEAT DISTORTION OF COPOLYMERS (0.1% CATALYST)

| Sample No. | Catalyst | Heat Distortion, inches | Minutes |
|---|---|---|---|
| 1 | control (uncatalyzed) | 1 | 2.50 |
| 2 | acetyl peroxide | 1 | 2.25 |
| 3 | 2,4-dichlorobenzoyl peroxide | 1 | 2.50 |
| 4 | p-chlorobenzoyl peroxide | 1 | 3.75 |
| 5 | benzoyl peroxide | 1 | 4.20 |
| 6 | 1-hydroxy cyclohexyl hydroperoxide | 1 | 4.25 |
| 7 | 2,2-bis (t-butyl peroxy) butane | 1 | 4.50 |
| 8 | methyl isobutyl ketone peroxide | 1 | 4.75 |
| 9 | methyl ethyl ketone peroxide | 1 | 5.00 |
| 10 | methyl amyl ketone peroxide | 1 | 5.50 |
| 11 | peracetic acid | 1 | 6.20 |
| 12 | dibenzol diperoxide | 1 | 6.50 |
| 13 | cyclohexanone peroxide | 1 | 6.75 |
| 14 | hydroxy heptyl peroxide | 1 | 7.10 |
| 15 | di-tertiary butyl peroxide | 1 | 8.50 |
| 16 | tertiary butyl perbenzoate | 1 | 11.50 |
| 17 | ditertiary butyl diperphthalate | 1 | 15.0 |
| 18 | p,p'-oxybis (benzene sulfonyl hydrazide) | 1 | 15.0 |
| 19 | tertiary butyl permaleic acid | 0.505 | 15.0 |
| 20 | tertiary butyl perphthalic acid | 0.239 | 15.0 |

It can quickly be seen from the foregoing table that the two catalysts employed in the process of this invention result in a product having much better heat resistance values than any of the other catalysts tested. These same values are also evidence of the very high degree of conversion obtained with the two catalysts.

EXAMPLE 2

The procedure of Example 1 was followed in making test bars from acrylonitrile/stryene copolymers containing 30% by weight of acrylonitrile and 70% by weight of styrene prepared with varying amounts of tertiary butyl permaleic acid and tertiary butyl perphthalic acid. The following table shows the effect of catalyst concentration upon the heat distortion values determined according to the procedure outlined above.

*Table II*

EFFECTIVENESS OF TERTIARY BUTYL PERMALEIC ACID AND TERTIARY BUTYL PERPHTHALIC ACID CATALYST UPON HEAT DISTORTION OF COPOLYMERS OF ACRYLONITRILE AND STYRENE (MAXIMUM 15-MINUTE TEST PERIOD)

| Catalyst, percent | Catalyst | Heat Distortion, inches | Time (Minutes) |
|---|---|---|---|
| 0.10 | Tertiary butyl perphthalic acid | 0.239 | 15 |
| 0.06 | ----do---- | 0.117 | 15 |
| 0.02 | ----do---- | 0.215 | 15 |
| 0.10 | Tertiary butyl permaleic acid | 0.505 | 15 |
| 0.06 | ----do---- | 0.113 | 15 |
| 0.02 | ----do---- | 0.346 | 15 |
| 0.00 | None (control) | 1.000 | 2.5 |

From these values it is observed that 0.06% is an optimum concentration for the particular acrylonitrile/styrene system above described. However, in the preparation of other copolymers, it has been found that amounts of catalyst as high as 5% by weight can be satisfactorily used while amounts as low as 0.01% by weight are often desirable.

We claim:

1. The process which comprises bulk copolymerizing acrylonitrile and at least one monomeric compound containing a polymerizable $CH_2=C<$ grouping and having a boiling point of at least 60° C. in the presence of from 0.01% to 5% by weight of a catalyst selected from the group consisting of tertiary butyl permaleic acid and tertiary butyl perphthalic acid, at temperatures of from 85° C. to 130° C. and at approximately atmospheric pressure, the amount of acrylonitrile being from 5% to 35% by weight of the total monomers.

2. The process which comprises bulk copolymerizing acrylonitrile and styrene in the presence of from 0.1% to 5% by weight of a catalyst selected from the group consisting of tertiary butyl permaleic acid and tertiary butyl perphthalic acid, at temperatures of from 85° C. to 130° C. and at approximately atmospheric pressure, the amount of acrylonitrile being from 5% to 35% by weight of the total monomers.

3. The process which comprises bulk copolymerizing acrylonitrile and styrene in the presence of from about 0.06% to 0.1% by weight of a catalyst selected from the group consisting of tertiary butyl permaleic acid and tertiary butyl perphthalic acid, at temperatures of from 85° C. to 130° C. and at approximately atmospheric pressure, the amount of acrylonitrile being about 30% by weight of the total monomers.

4. The process which comprises bulk polymerizing acrylonitrile and styrene in the presence of from about 0.06% to 0.1% by weight of tertiary butyl permaleic acid catalyst, at temperatures of from 85° C. to 130° C. and at approximately atmospheric pressure, the amount of acrylonitrile being about 30% by weight of the total monomers.

5. The process which comprises bulk polymerizing acrylonitrile and styrene in the presence of from about 0.06% to 0.1% by weight of tertiary butyl perphthalic acid catalyst, at temperatures of from 85° C. to 130° C. and at approximately atmospheric pressure, the amount of acrylonitrile being about 30% by weight of the total monomers.

References Cited in the file of this patent

UNITED STATES PATENTS

| 2,426,476 | Vaughan et al. | Aug. 26, 1947 |
| 2,497,323 | Roedel | Feb. 14, 1950 |

OTHER REFERENCES

Rybolt et al.: Modern Plastics (April, 1949), pages 101–103, 150, 152, 154, 157.